(12) United States Patent
Corden (10) Patent No.: US 10,800,070 B2
(45) Date of Patent: Oct. 13, 2020

(54) MOULD TOOLS

(75) Inventor: Thomas Corden, West Bridgford (GB)

(73) Assignee: CYTEC INDUSTRIAL MATERIALS (DERBY) LIMITED, Heanor, Derbyshire (GB)

( * ) Notice: Subject to any disclaimer, the term of this patent is extended or adjusted under 35 U.S.C. 154(b) by 2222 days.

(21) Appl. No.: 13/810,867

(22) PCT Filed: Jul. 19, 2011

(86) PCT No.: PCT/GB2011/001076
§ 371 (c)(1),
(2), (4) Date: Apr. 9, 2013

(87) PCT Pub. No.: WO2012/010827
PCT Pub. Date: Jan. 26, 2012

(65) Prior Publication Data
US 2013/0187306 A1 Jul. 25, 2013

(30) Foreign Application Priority Data

Jul. 22, 2010 (GB) .................................. 1012293.5

(51) Int. Cl.
*B29C 33/00* (2006.01)
*B29C 33/40* (2006.01)
(Continued)

(52) U.S. Cl.
CPC ........ *B29C 33/0088* (2013.01); *B29C 33/302* (2013.01); *B29C 33/38* (2013.01); *B29C 33/40* (2013.01)

(58) Field of Classification Search
CPC ... B29C 33/0088; B29C 33/40; B29C 33/302; B29C 33/38
(Continued)

(56) References Cited

U.S. PATENT DOCUMENTS 3,960,236 A * 6/1976 Holmes ................. E04C 2/3405
112/403
5,340,423 A * 8/1994 Jacaruso ............. B29C 33/3842
156/158

(Continued)

FOREIGN PATENT DOCUMENTS

EP 0662380 A2 * 7/1995 ......... B29C 33/3842
GB 2254820 A 10/1992
(Continued)

OTHER PUBLICATIONS

Typical Properties of Epoxy. Plastic Material Data Sheets. 2004; 2010.*
(Continued)

*Primary Examiner* — Leith S Shafi
(74) *Attorney, Agent, or Firm* — Thi Dang (57) ABSTRACT

A mould tool (10) for moulding mouldable material, the mould tool comprises a tool body (12) having a plurality of tool body sections (14), at least two of which comprise an inner polymer foam core (16) within an outer skin (18) of resinous material and are stacked one above the other, the tool (10) further comprises a mould skin (20) extending over the body (12) to provide a mould surface (22) on which mouldable material can be moulded. A method of manufacturing such a mould tool and a tool body are also provided.

7 Claims, 6 Drawing Sheets

(51) Int. Cl.
B29C 33/30 (2006.01)
B29C 33/38 (2006.01)

(58) Field of Classification Search
USPC ..... 264/263, 219–227, 31–35; 249/184, 119, 249/126, 118; 425/470, 175–180
See application file for complete search history.

(56) References Cited

U.S. PATENT DOCUMENTS

| | | | | |
|---|---|---|---|---|
| 5,589,243 | A | * | 12/1996 | Day .................... B29C 44/5654 428/316.6 |
| 2006/0280927 | A1 | | 12/2006 | Albright et al. |
| 2007/0261788 | A1 | * | 11/2007 | Stenard ................. B29C 33/40 156/307.1 |
| 2010/0062099 | A1 | * | 3/2010 | Funke .................... B29C 33/02 425/446 |
| 2010/0136292 | A1 | * | 6/2010 | Lucas .................... B29C 33/38 428/156 |

FOREIGN PATENT DOCUMENTS

| | | |
|---|---|---|
| WO | 96/40488 A1 | 12/1996 |
| WO | 2007/115239 A2 | 10/2007 |

OTHER PUBLICATIONS

Typical Properties of Polyurethane. Plastic Material Data Sheets. 2004; 2010.*
Yaws' Critical Property Data for Chemical Engineers and Chemists. Released Jul. 16, 2012. Table 210.*
Search Report dated Mar. 4, 2011 by the United Kingdom Intellectual Property Office in related patent application No. GB1012293.5.
International Search Report and Written Opinion dated Dec. 2, 2011 in PCT Application PCT/GB2011/001076.

* cited by examiner

MOULD TOOLS

This application claims the benefit of prior United Kingdom Application No. 1012293.5, filed on Jul. 22, 2010, which is incorporated herein in its entirety.

The present invention relates to mould tools, particularly but not exclusively to mould tools for moulding curable resin composite materials.

Traditionally, mould tools, particularly those used in moulding curable resin composite materials, have been produced from a pattern hand-shaped or machined to the required geometry. A release agent is typically applied and the tool skin cured thereon. The cured tool skin is then released from the pattern and a backing structure applied to support the skin. Mould tools produced in this way suffer from a number of significant drawbacks. For example, even with the use of sophisticated computer modeling and predictions of the thermal expansion and chemical shrinkage of the materials used in the tool skin as they cure, there is a limit as to how accurately the tool skin can be moulded. Mould tools produced according to this conventional moulding technique are generally limited to relatively small scale tooling and therefore do not adequately cater for the production of the complex, relatively large mould tools demanded these days.

An alternative approach to producing mould tools is to form the main body of a mould tool, shape this to the desired profile and apply a tool skin. Mould tools produced in this way can generally be produced more accurately, but do currently suffer certain drawbacks.

The materials used for the main body of such tools are typically carbon, glass or ceramic foam. Whilst offering certain advantages, such materials also present significant disadvantages. Each of these foams is brittle and inherently vulnerable to cracking and delamination from the tool skin. With carbon foam, there are concerns regarding combustibility and moisture absorption. Carbon foam is a relatively expensive material and tools generally need to be formed in an $N_2$ pressurised autoclave. Ceramic foam is a particularly dense material, which can be restrictive in its utility in forming relatively large mould tools.

According to the present invention there is provided a mould tool for moulding mouldable material, the tool comprising a tool body comprising a plurality of tool body sections at least two of which comprise an inner polymer foam core within an outer skin of resinous material and are stacked one above the other, the tool further comprising a mould skin extending over the tool body to provide a mould surface on which mouldable material can be moulded.

A series of at least three tool body sections may be stacked one above the other.

A tool body section in a stacked series of tool body sections may be in direct mutual contact with at least one other stacked tool body section in the series.

The tool body may comprise at least two tool body sections arranged in a side-by-side configuration, which may be in direct mutual contact.

A series of tool body sections may extend in a side-by-side configuration to form a layer of tool body sections.

The tool body may comprise a plurality of layers of tool body sections in a stacked configuration.

Each of the tool body sections in a tool body may comprise an inner polymer foam core with an outer skin of resinous material.

The resinous material is preferably a fibre-reinforced resinous material and may comprise a cured or curable resinous material, reinforced with fibre reinforcement such as one or more of carbon fibre, glass fibre, Aramid and the like. The fibre reinforcement may be directional, providing a tool body section with a certain characteristic such as relatively high strength or rigidity in a particular direction. For example, the fibre reinforcement may be arranged to extend lengthwise in a particular direction, offering the material unidirectional fibre reinforcement characteristics. The fibre reinforcement may extend in two or each of the X, Y and Z axis directions of the material.

The resinous material may comprise a thermoset resin such as one or more of epoxy resin, BMI, phenolic resin, cyanate ester.

Alternatively or in addition, the resinous material may comprise thermoplastic resin such as one or more of PES, PPIS, PI, PEI, PEEK.

The fibre-reinforced resinous material may have a coefficient of thermal expansion of less than 8 ppm/° C., and preferably less than 5 ppm/° C.

The outer skin may extend around the inner core of a tool body section to confine expansion of the core, maybe to form a reinforcing sleeve around the core. The outer skin may have a laminate structure.

The polymer foam core may have a density of less than 250 kg/m$^3$, and may be less than 150 kg/m$^3$.

The polymer foam may have a coefficient of thermal expansion of between 20 and 80 ppm/° C.

Adjacent tool body sections within the tool body may be secured together, such as by bonding with a bonding agent such as an adhesive or resin.

Alternatively or in addition, tool body sections may be fused together, such as during the cure thereof. The tool body sections may be directional, such as aforesaid, and may be arranged in an orthogonal relationship within the tool body.

The tool body sections may be arranged to give the tool body directional characteristics or overall isotropic characteristics.

At least some of the tool body sections may be elongate. The fibre reinforcement within the outer skin of a tool body section may be directional, or generally directional, extending in a direction along the length of the section.

The fibre reinforcement may have a continuous structure, such as a unidirectional, woven, weaved, stitched, braided and/or knitted structure.

The fibre reinforcement may have a discontinuous structure such as an isotropic chopped mat structure.

The tool body may comprise a plurality of layers of tool body sections, each layer of which may comprise a plurality of tool body sections.

Some, and in certain embodiments all of the tool body sections within a layer extend generally mutually parallel, preferably with adjacent sections in mutual contact.

The tool body sections in alternate layers may extend generally in the same direction, and at least some may extend generally perpendicularly to tool body sections in an adjacent layer.

The tool body sections preferably have a symmetrical lateral cross-section, such as a square, rectangular, triangular, pentagonal, hexagonal, heptagonal, octagonal, circular or oval cross-section.

The cross-section of each tool body section within a layer may be the same.

The cross-section of each tool body section within a tool body may be the same.

The mould skin may comprise a cured or curable resinous material which is preferably reinforced with fibre reinforcement such as carbon fibre, Aramid, glass fibre.

The mould skin may be secured to the tool body, which may be by bonding with an adhesive or similar bonding agent. The mould skin may be secured directly to the tool body, such as by fusion upon or during cure of the mould skin on the tool body.

The mould skin may have the same or similar coefficient of thermal expansion as the outer skin of the or the majority of the tool body sections within the tool body, and particularly those to which it bonds and/or fuses.

The mould skin may comprise the same resinous material and/or fibre reinforcement as the outer skin of the or the majority of the tool body sections within the tool body.

The fibre reinforcement within the mould skin may be unidirectional within the mould surface, may be multidirectional or generally isotropic.

According to a second aspect of the present invention there is provided a tool body comprising a plurality of tool body sections, at least two of which comprise an inner polymer foam core within an outer skin of resinous material and are stacked one above the other.

The tool body may be as described above in any of paragraphs five to thirty above.

According to a third aspect of the present invention there is provided a method of manufacturing a mould tool for moulding mouldable material, the method comprising arranging a plurality of tool body sections to form a tool body, at least two of the tool body sections each of which comprises an inner polymer foam core within an outer skin of resinous material are stacked one above the other, and forming a mould skin over the tool body to provide a mould surface on which mouldable material can be moulded.

A series of at least three tool body sections may be stacked one above the other. The tool body sections may be stacked so that at least some adjacent sections are in direct mutual contact.

At least two tool body sections may be arranged in a side-by-side configuration.

Tool body sections may be in direct mutual contact.

A series of tool body sections may be arranged to extend in a side-by-side configuration to form a layer of tool body sections.

A plurality of layers of tool body sections may be arranged in a stacked configuration.

The tool body sections used may be as described above.

The tool body sections may be arranged in a series configuration and preferably in mutual contact to provide a substantially continuous tool body.

The tool body sections within each layer may generally extend in the same direction, for example when the tool body sections are elongate the tool body sections within a layer all extend generally mutually parallel.

In embodiments where the fibre reinforcements within the outer skins have directionality, adjacent tool body sections within a layer can be arranged to have generally parallel directionality or alternatively orthogonal/mutually perpendicular directionality.

Adjacent tool body sections in adjacent layers may be arranged to have generally mutually orthogonal or perpendicular directionality, or alternatively generally mutually parallel directionality.

Adjacent tool body sections may be bonded together using a bonding agent. Alternatively, adjacent tool body sections may bond directly together, such as by fusing together, during cure of the resinous material in the outer skin. In further embodiments, some or all of the tool body sections may not bond or fuse together.

Once the tool body has been formed it may be subjected to conditions to fuse or bond the tool body sections together. In embodiments where the outer skin of some or all of the tool body sections is curable, the conditions may be cure conditions to cure the curable resinous material in the tool body sections.

The tool body may be shaped to the desired general profile for the mould tool, particularly the mould surface thereof. The tool body may be shaped using computer controlled shaping apparatus such as CNC machinery, by hand or otherwise.

The mould skin may be as described above.

The mould skin may be located on the tool body in a curable condition, and cured in situ using conventional curing techniques.

Both the curable outer skin and mould skin may be cured during the same cure stage.

The mould skin may be located directly on the tool body, or an intervening layer or layers may be provided, such as one or more bonding layers, compliant layers such as an elastomeric layer or the like.

The mould skin may be located on the tool body in the form of a pre-preg. The mould skin may be a multilayer laminate.

The mould skin may be finished, preferably when cured, such as by machining, polishing or otherwise to provide the mould surface.

The invention further provides a method of manufacturing a tool body comprising stacking at least two tool body sections one above the other, each of the tool body sections comprising an inner polymer foam core within an outer skin of resinous material.

The invention also provides a method of moulding an article comprising placing mouldable material on the mould surface of a mould tool as described above, and subjecting the material to moulding conditions.

The moulding conditions may include cure conditions to cure the mouldable material, such as elevated temperatures and/or vacuum pressure conditions.

The elevated temperature may be up to 250° C. The moulding conditions may comprise pressure conditions exceeding 1 bar, and may be in the range 50 to 150 psi.

Embodiments of the present invention will now be described by way of example only, with reference to the accompanying drawings.

The invention provides a mould tool 10 for moulding mouldable material, the mould tool comprising a tool body 12 comprising a plurality of tool body sections 14, at least two of which comprise an inner polymer foam core 16 within an outer skin 18 of resinous material and are stacked one above the other, the tool 10 further comprising a mould skin 20 extending over the body 12 to provide a mould surface 22 on which mouldable material can be moulded.

Figure 2:
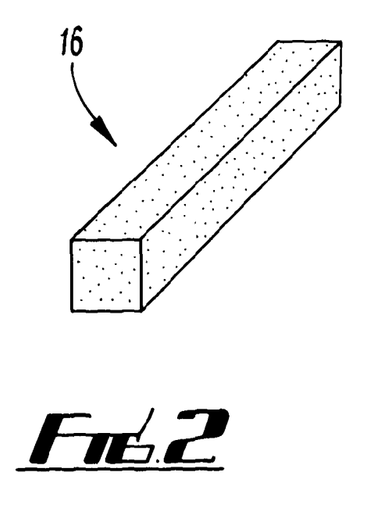
FIG. 2 is a diagrammatic perspective view of a polymer foam core of the present invention.
Figure 3:
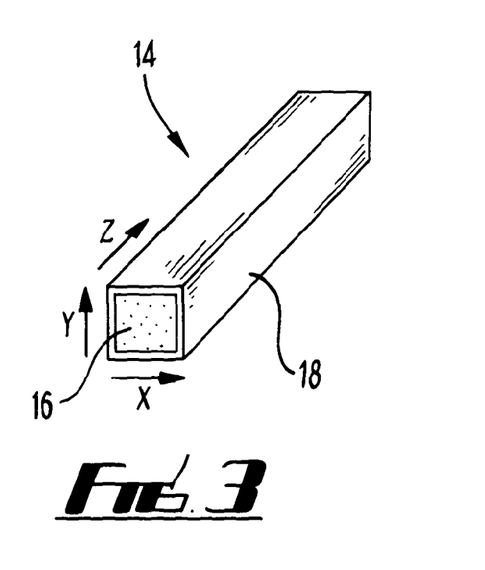
FIG. 3 is a diagrammatic perspective view of a mould tool body of the present invention.

In more detail, with particular reference to FIGS. 2 and 3, a tool body section 14 comprises an elongate polymer foam core 12 with a square lateral cross-section to have the form of a polymer foam core block. This is enclosed along its length by the outer skin 18. The ends of the core 16 are not covered with the outer skin, as generally this does not prove necessary for the efficient functioning of the tool body sections according to the present invention. To close off the ends would add generally unnecessary labour and expense, but it will be appreciated that when coverage of the ends is useful, or desirable, this is within the scope of the present invention.

The inner core 12 can be of any suitable polymer foam, but it is preferred that polymer foams with densities of less than 250 kg/m³, and in certain embodiments less than 150 kg/m³ are used. This helps to ensure that the overall weight of the mould tools of the present invention can be kept down to facilitate manufacture, handling, and in certain circumstances operation of mould tools of the present invention.

The polymer foam typically has a coefficient of thermal expansion of between 20 and 80 ppm/° C. Polymer foams with a coefficient of thermal expansion lower than this range are generally unavailable. Having such a relatively high coefficient of thermal expansion presents severe limitations on the use of such materials in the manufacture of mould tools unless used in the manner described herein with regard to the present invention.

The outer skin 18 comprises a curable resinous material reinforced with fibre reinforcement such as carbon fibre, glass fibre, Aramid and the like.

The resinous material is typically a thermoset resin such as one or more of epoxy resin, BMI, phenolic resin or cyanate ester, or any other suitable thermoset resin. Alternatively or in addition the resinous material can comprise thermoplastic resin such as one or more of PES, PPIS, PI, PEI and/or PEEK.

The fibre reinforcements are typically impregnated within the resinous material, and the outer skin 18 is typically applied to the core in the form of a flexible pre-preg, wrapped or rolled around the foam core 16. A bonding or tacking agent may be used to hold the curable outer skin 18 in place around the core 16, prior to cure.

The fibre reinforcement within the outer skin 18 may be directional, providing certain characteristics in a particular direction. For example, the fibre reinforcement may be unidirectional and arranged to extend lengthwise down the length of the tool body section 14, offering the material and thus the tool body section 14 unidirectional fibre reinforcement characteristics, known to persons skilled in the art.

The orientation of the fibre reinforcements can be selected according to the desired mechanical characteristics of the tool body section 14, and ultimately of the tool body 12 and mould tool 10.

In certain embodiments, the fibre reinforcement may extend in each of the X, Y and Z axis directions, as indicated in FIG. 3, to give the tool body section 14 generally isotropic properties.

The fibre reinforcement can be continuous, such as unidirectional, woven, weaved, stitched, braided and/or knitted.

In further embodiments, the fibre reinforcement may be discontinuous.

Any suitable fibre reinforcements can be used, but typically carbon fibre, glass fibre, Aramid and the like are used.

Figure 1:
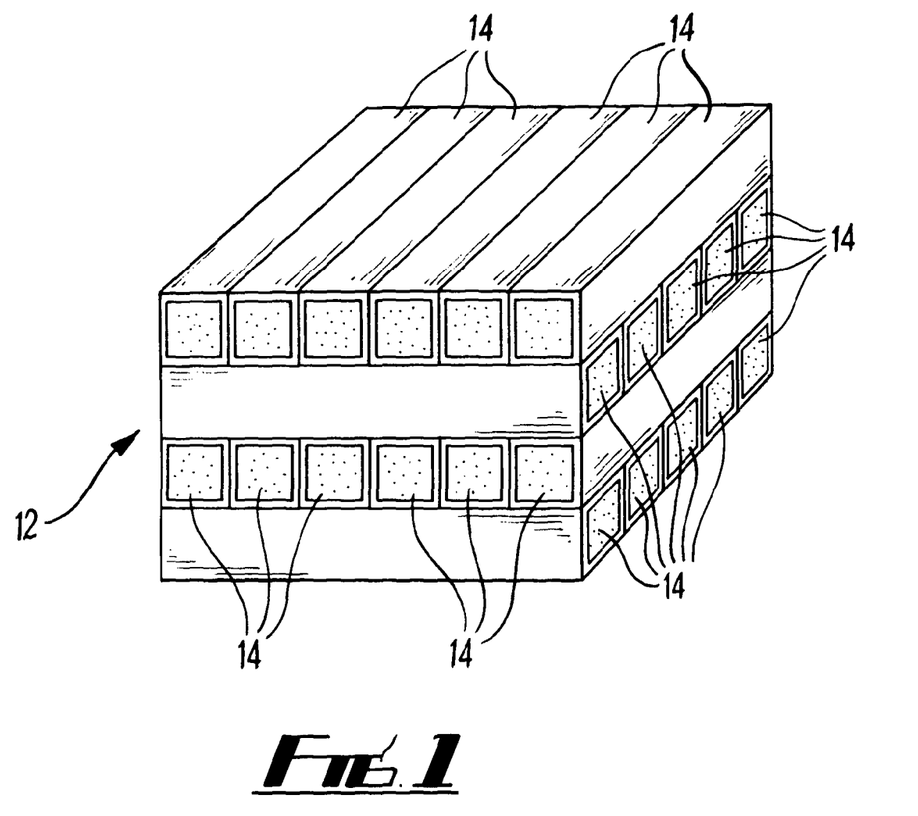
FIG. 1 is a diagrammatic perspective view of a mould tool body according to the present invention.

A typical tool body 12 according to the present invention comprises a plurality of tool body sections 14 aligned in series to form a layer of tool body sections 14. FIG. 1 illustrates a simple, multilayered tool body 12, each layer comprising a series of adjacent tool body sections 14.

When forming a tool body 12, the number, size, shape and type of tool body sections 14 and the configuration of the assembly of tool body sections 14 will be selected according to the desired final size, shape and mechanical characteristics of the tool body 12.

It will be appreciated that FIG. 1 illustrates a very simple arrangement, and that it is within the scope of the present invention for considerably more complex and sophisticated arrangements of tool body sections to be assembled to enable more sophisticated tool body geometries to be achieved. Although it is envisaged that the tool body sections 14 used within a tool body 12 will typically be the same, not least for simplicity of manufacture, tool body sections of different sizes, shapes and composition properties could be used within a tool body.

With reference to FIG. 1, the tool body 12 is formed by initially arranging the lower series of tool body sections 14 in parallel alignment and in mutual contact to form a layer. At this stage the tool body sections 14, in particular the outer skins 18, are typically uncured or only partly cured, although it is within the scope of the invention for some or all of the tool body sections to be cured before being assembled into a tool body. A second layer of similar tool body sections 14 is stacked directly on the lower layer, but with the lengthwise direction of the tool body sections 14 running mutually perpendicular between the layers.

A third layer of tool body sections 14 is stacked directly above the second layer, using similar tool body sections such that the configuration of the third layer is essentially identical to that of the first layer.

A fourth layer of similar configuration to the second layer is then arranged directly on the third layer.

The tool body 12 of FIG. 1 is therefore of a generally rectangular overall geometry comprising four stacked layers of tool body sections.

As indicated above, the tool body sections 14 are typically arranged whilst in a curable condition. This condition applies particularly to the outer skin 18. When the desired configuration of tool body sections 14 has been achieved, the tool body 12 is subjected to cure conditions, typically involving elevated cure temperatures of up to 250° C. Conventional cure techniques can be employed.

A significant advantage of the present invention is that enclosing the inner polymer foam core within the outer skin 18 helps to prevent undesirable expansion of the polymer core during the formation of the tool body 12 and during use of the mould tool in moulding, particularly curable moulding materials at elevated cure temperatures. The coefficient of thermal expansion of the polymer foam used in the core 16 will determine the extent to which the polymer foam would naturally tend to expand at particular temperatures. Polymer foams generally available have relatively high coefficients of thermal expansion (typically in the range 20 to 80 ppm/° C.) which means that these foams, whilst offering certain advantages over conventional foams used for mould tools, suffer from the major disadvantage of a natural tendency to expand to unacceptable degrees when subjected to elevated temperatures, which would adversely restrict the potential application of mould tools made with such materials to low temperature cure moulding applications. However, the outer skin 18 of the mould tools and sections of the present invention resist the natural tendency for the foam to expand even at temperatures as high as 250° C. due to the strength and low coefficient of thermal expansion of the material of the outer skin 18 and the inherent strength of that material acting to confine the polymer foam therewithin. The tool body sections 14 of the present invention will therefore not expand or bulge to any significant degree under the expansion pressure of the foam cores and therefore the tool body 12 will generally retain its desired shape without any undesirable bulging which could otherwise occur through expansion of the polymer foam.

An inherent characteristic of polymer foams which has until now inhibited their application in mould tools is that they have a tendency to collapse when subjected to elevated pressures. This is particularly so when the foam has been softened to some extent by the application of elevated temperatures, such as those typically used to cure thermoset resins. Often, elevated temperatures and pressure conditions are preferred or required to cure certain thermoset and thermoplastic resins, such as those used as matrix resins for mouldable fibre-reinforced resinous materials, and so using polymer foam in the mould tool has hitherto been limited to relatively low pressure (1 bar/atmosphere) to avoid collapse of the foam structure, which would represent an unacceptable failure of a mould tool.

The tool sections 14 of the present invention are considerably less prone to such polymer foam collapse as the outer skin 18 is found to support the inner core 16 to help restrain any tendency to collapse. This is particularly so once the polymer foam has been bonded, fused or otherwise stuck to the inside of the outer skin 18 either using suitable bonding agents and/or as a result of the outer skin 18 having been cured in situ over the foam core 16. It has been found that the tool body sections 14, and in particular the polymer foam cores thereof, are generally resistant to collapse even when subjected to elevated pressures as high as 150 psi and temperatures in the order of 250° C.

The skilled person can determine for each tool section the degree of expansion that the inner foam is likely to have at the intended cure temperature, and the expansion forces the outer skin 18 is likely to experience from the core within. Relevant factors include the foam's CTE, the volume of foam and the temperature to which it will be exposed. The outer skin 18 can be engineered accordingly to provide sufficient resistance to prevent undesirable expansion and deformation.

The typical close-packed arrangements of the tool body sections 14 will further help prevent any undesirable bulging of the tool body 12. Although the outer skin 18 of each tool body section 12 confines the respective inner polymer core 16, if there is any tendency for the outer skin to expand or bulge out under the pressure of the expansion forces exerted thereon by the core 16 therewithin, the stacking of tool sections 18 within the tool body and the mould tool helps to restrain any such expansion or bulging as adjacent tool body sections react against and resist any forces exerted thereon by an adjacent section trying to expand or bulge. This interaction and restraining action occurring between stacked and particularly adjacently stacked tool body sections acts to resist any undesirable distortion of the tool body sections and mould tools of the present invention.

Once the tool body sections 14 are cured to the desired state, the tool body 12 is formed.

Typically, during cure, the tool body sections 14 fuse together so that the tool body 12 becomes a consolidated unit, facilitating further processing, handling and manufacture of a mould tool therewith. Such fusion and consolidation further acts to stabilise the tool body against unwanted distortion.

In certain embodiments, agents may be used to facilitate fusion and/or to bond the or certain tool body sections 14 together.

In certain embodiments, the tool body sections 14 may not be securely attached together, but such arrangements are not thought to be as advantageous as those where the tool body sections are secured together.

As indicated above, the tool body sections 14 can have directionality, in that they have direction-specific characteristics. In certain embodiments, as described above, the fibre reinforcement within the outer skins have direction, and as an example in FIG. 1, the fibres can be seen extending longitudinally and unidirectionally along the length of each body section 14.

It will be appreciated that the person skilled in the art can produce tool body sections having particular directional characteristics suitable for providing the tool body sections 14, and ultimately the tool body 12 and mould tool 10, with the desired characteristics.

Figure 4:
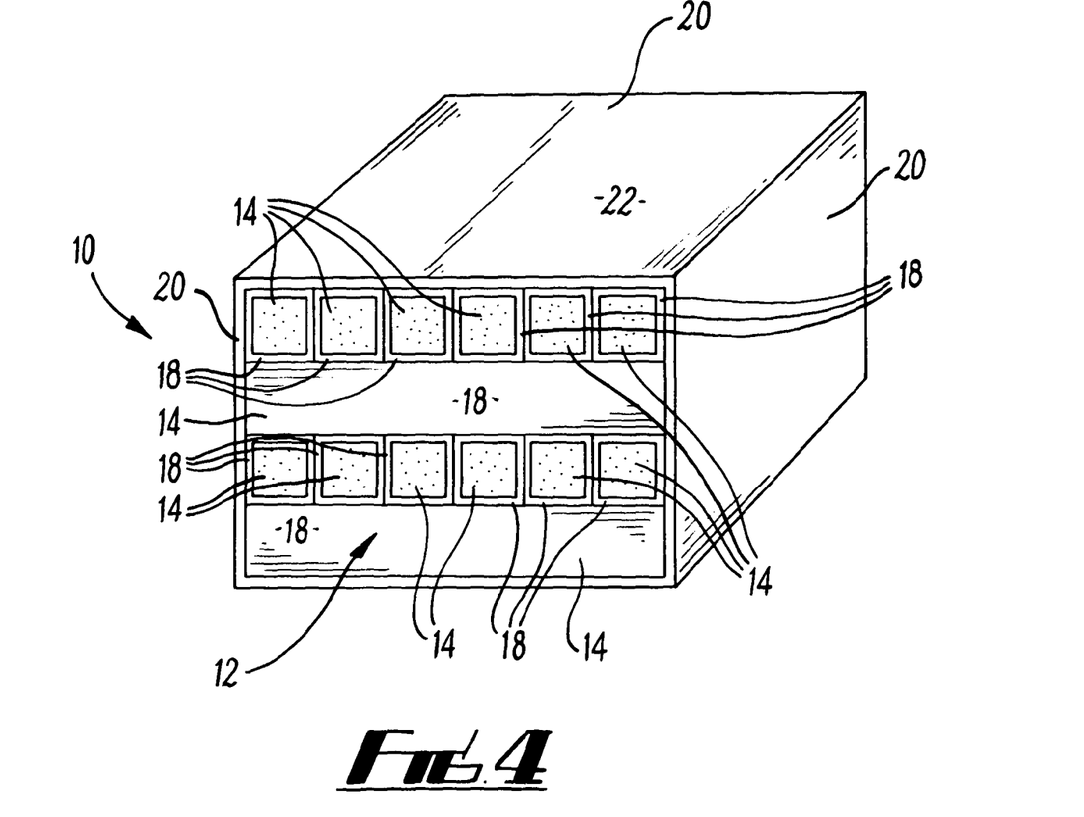
FIG. 4 is a diagrammatic perspective view of a mould tool according to the present invention.

With reference to FIG. 4, the mould tool 10 is completed by forming a mould skin 20 over the tool body 12.

The mould skin 20 is typically a fibre-reinforced resinous material such as one or more of thermoset and/or thermoplastic resin. Typically, the mould skin 20 would be applied over the tool body 12 in a curable condition and would be applied using conventional laminating techniques. The mould skin 20 would typically comprise fibre reinforcement such as one or more of carbon fibre, Aramid, glass fibre or any suitable fibre reinforcement.

Typically, the mould skin 20 would have the same or a similar coefficient of thermal expansion as the outer skin 18 of the or the majority of the tool body sections 14 within the tool body 12. Indeed, in certain embodiments, the resinous material and/or the fibre reinforcement of the mould skin 20 is the same as that of the outer skin 18 of the or the majority of the tool body sections 14 within the tool body 12.

In typical embodiments, the mould skin 20 is located directly over the outer surfaces of the outermost tool body sections 14 of the tool body 12, but an intervening layer or layers, such as a bonding layer or a compliant intermediate layer such as an elastomeric layer, can be located between the tool body 12 and the mould skin 20 if required.

As with the tool body sections 14, the directionality of the fibre reinforcements in the mould skin 20 can be selected according to the desired characteristics of the mould tool 10.

Once the mould skin 20 is in situ, it is typically subjected to cure conditions to cure the mould skin 20 on the tool body 12. During the cure process the mould skin 20 would typically fuse to the outer surfaces of the tool body 12 to secure the mould skin 20 in place. This can also help to hold the tool body sections 14 together and ensure the integrity of the mould tool 10.

In certain embodiments, the mould skin 20 can be located over the tool body 12 with the tool body sections 14 still in a curable condition and the tool body sections 14 and the mould skin 20 cured together during the same cure stage.

The mould skin 20 would typically be subjected to finishing techniques, such as machining, polishing and suchlike, to form an accurate mould surface 22 on which mouldable material can be moulded.

It will be appreciated that the mould surface 22 of the mould tool 10 is illustrated in FIG. 4 as a very simple, flat surface for ease of illustration. The mould surface 22 would however typically be of considerably more intricate profile.

Figure 5:
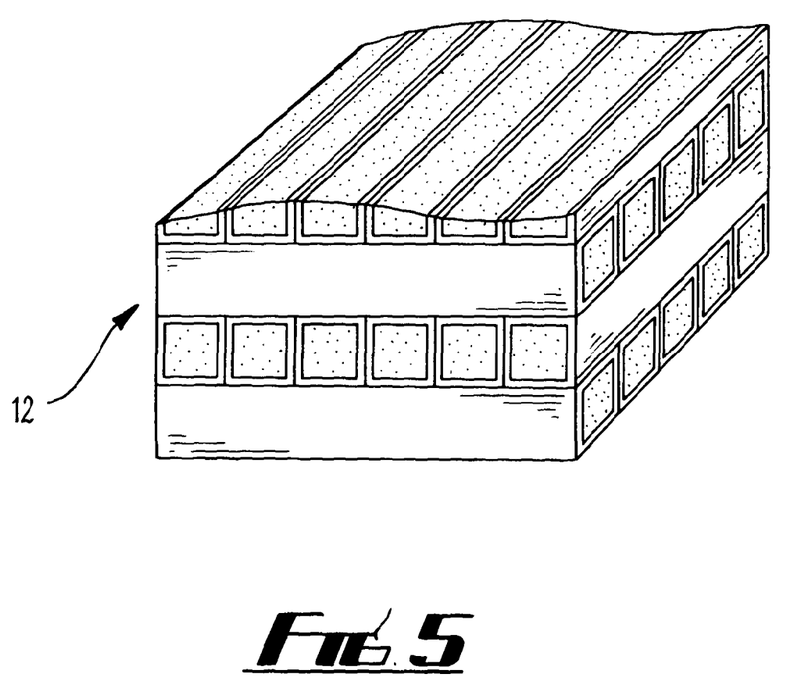
FIG. 5 is a diagrammatic perspective view of a mould tool body according to a further embodiment of the present invention.

FIG. 5 shows the mould tool body of FIG. 1, with the upper layer of tool body sections 14 profiled to form a slightly more intricate profile on which the mould surface 22b (FIG. 6) is formed. This profiling is typically done following the cure and consolidation of the tool body 12.

Figure 6:
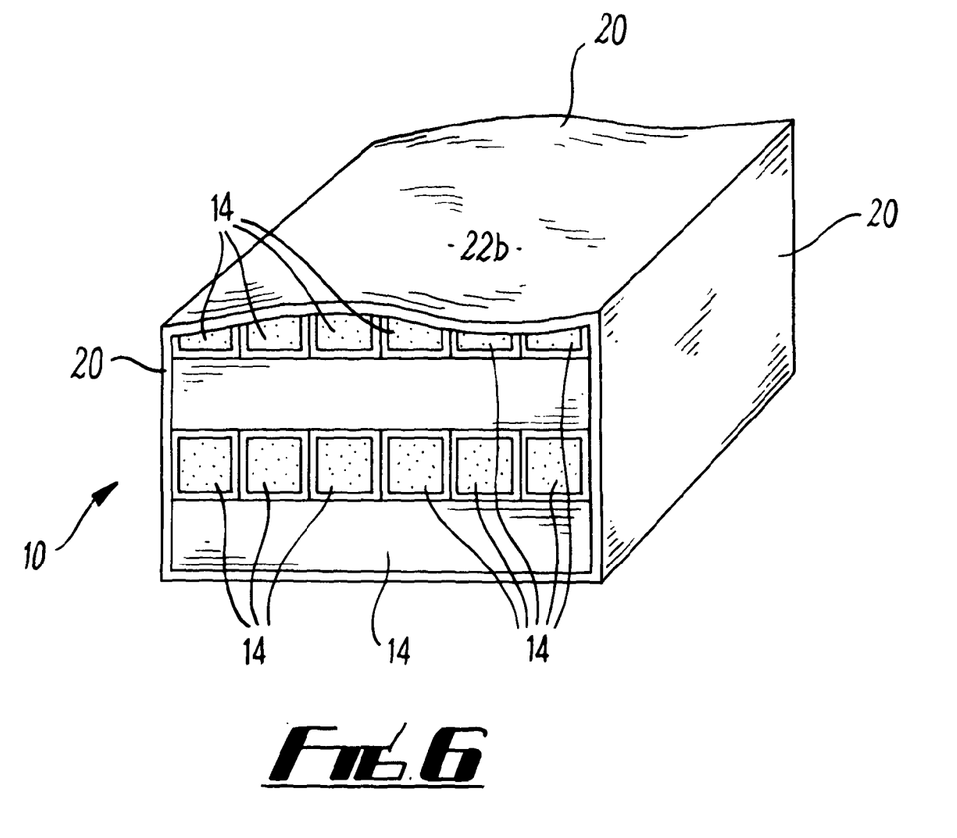
FIG. 6 is a diagrammatic perspective view of a mould tool formed using the tool body of FIG. 5.

FIG. 6 shows the tool body 12 of FIG. 5 with the outer mould skin 20 formed thereon. This is formed in the same way as described above in relation to FIGS. 1 to 4, but as will be seen, the mould surface 22b has a slightly more intricate profile.

It will be appreciated that unlike the embodiment shown in FIGS. 1 to 4, certain of the tool body sections 14 (those in the upper layer) have a reduced cross-sectional profile and the inner core 16 is exposed on the outer surface of the tool body 12.

It is found that this is of no detriment to the performance of the mould tool 10, as the mould skin 20 effectively closes off those cross-sections. However, it is preferred that in such arrangements, the mould skin 20 securely bonds or fuses to the upper edges of the outer skins 18 of the tool body sections 14. Using the same or compatible materials in the outer skin 18 and the mould skin 20 can help facilitate such bonding and/or fusion of the outer skins 18 and the mould skins 20 to form a stable tool 10.

It will be appreciated that the configuration of tool body section 14 can be determined according to the desired properties of the tool body 12 and mould tool 10 and also the size and configuration of the tool body sections 14, tool body 12 and mould tool 10.

In certain embodiments, tool body sections 14 of different size, shape and composition can be used within a tool body 12. Tool body sections 14 of other than square cross-section can be used. Typically, it is envisaged that symmetrical cross-sections are advantageous and in particular cross-sections that closely sit against each other in a way that helps to form a continuous body of tool body sections 14, without any significant gaps therebetween. As an example, rectangular, triangular, pentagonal, hexagonal, heptagonal cross-sections can be used. In certain embodiments, however, other shapes can be used such as circular and oval cross-sections.

Figure 7:
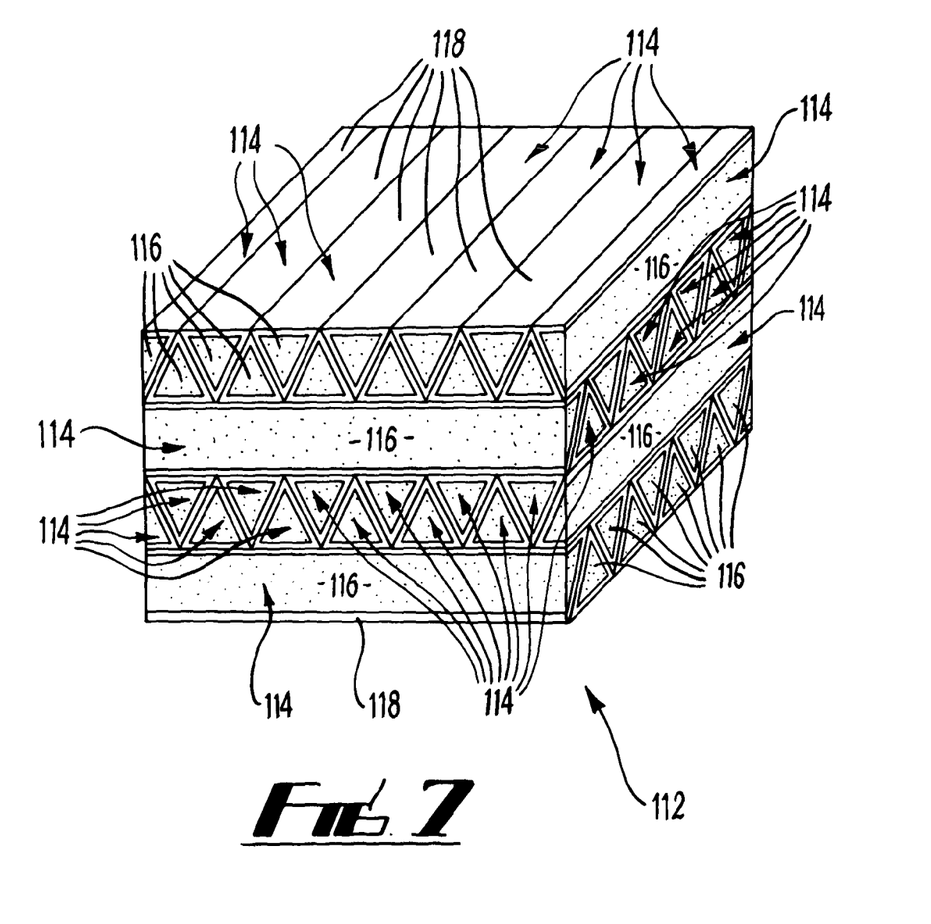
FIG. 7 is a diagrammatic perspective view of a mould tool body according to a still further embodiment of the present invention.

FIG. 7 is a diagrammatic illustration of a mould tool body 112 having the same general four layer structure as the tool bodies 12 described above, but with each tool body section 114 having a triangular lateral cross-section. Due to the greater inherent structural rigidity and strength of the triangular configuration, when such cross-sections are used the tool bodies 112 can be of particularly high inherent rigidity and flexural strength that can render them particularly suitable for use in very large and/or mobile mould tools such as large mandrel type mould tools or spar tools, where significant inherent structural stiffness of the tool body is necessary.

The mould tools of the present invention offer a number of advantages over known mould tools.

The modular construction enables the mechanical properties of the mould tool to be engineered according to the desired characteristics of the mould tool 10, for example where particularly high inherent stiffness is required the number, size, shape, composition and configuration of the tool body sections 14 can be selected accordingly to enable a suitable mould tool 10 to be engineered.

Polymer foam is relatively inexpensive in comparison to conventional foams such as carbon foams. Polymer foams also are relatively lightweight and thus easy to handle. Polymer foams are typically relatively easy to shape, are non-conductive, offer generally low dust properties, and do not generally suffer from cracking or moisture retention. The present invention enables such materials to be used within mould tools and tool bodies that hitherto have not been considered practicable, particularly due to the high tendency for undesirable degrees of expansion of the foam to occur at temperatures typically needed for mould tools and tool bodies for use in moulding thermoset and thermoplastic curable resins. Moreover, the present invention also addresses another known disadvantage of polymer foams in mould tools, and that is their tendency to collapse under elevated pressure conditions, particularly when combined with elevated temperature conditions which are frequently needed in moulding thermoset and thermoplastic resinous materials.

It is found that there is generally no significant delamination of the mould skin 20 from the tool body 12 and therefore it is typically found that an intermediate, compliant layer, such as an elastomeric layer, is not required, which provides a saving on production time and cost.

The mould tools 10 of the present invention also suffer no appreciable deformation due to expansion of the polymer foam.

The mould tools 10 of the present invention can therefore take the form of large, very structurally stiff mould tools that are relatively lightweight and relatively easy to handle and to operate. The mould tools 10 of the present invention are therefore particularly advantageous in the manufacture of large scale mandrels, such as for automated fibre winding and tape placement for aeroplane fuselage barrels, tools for tape placement of spars, aeroplane wing skins and any other large composite components, particularly those where a lightweight tool with a low overall coefficient of thermal expansion that can be used at high temperatures is required.

Various modifications may be made without departing from the spirit or scope of the present invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A mould tool for moulding mouldable material, the tool comprising a tool body comprising a plurality of layers of elongate tool body sections in a stacked configuration, each tool body section comprising an inner polymer foam core enclosed along its length by an outer skin of fibre-reinforced resinous material, and a fibre-reinforced mould skin surrounding the tool body to provide a mould surface on which mouldable material can be moulded, wherein the tool body sections in each layer extend side-by-side in parallel and extend perpendicularly relative to the tool body sections in an adjacent layer.

2. A mould tool as claimed in claim 1, wherein adjacent tool body sections are bonded to each other by an adhesive, and the fiber-reinforced mould skin is secured to the tool body by bonding with an adhesive.

3. A mould tool as claimed in claim 1, in which the fibre-reinforced resinous material is curable.

4. A mould tool as claimed in claim 1, in which the fibre-reinforced resinous material comprises a curable resinous material reinforced with fibre reinforcement selected from carbon fibres, glass fibres, and aramid fibres.

5. A mould tool as claimed in claim 1, in which the polymer foam core has a density of less than 250 kg/m$^3$.

6. A mould tool as claimed in claim 1, in which the outer skin of a tool body section comprises fibres extending generally in a direction along the length of the tool body section.

7. A mould tool as claimed in claim 1, in which the mould skin has the same or similar coefficient of thermal expansion as the outer skin of the tool body sections within the tool body.

* * * * *